US005482428A

United States Patent [19]

Kuhlman

[11] Patent Number: 5,482,428
[45] Date of Patent: Jan. 9, 1996

[54] APPARATUS AND METHOD FOR SEPARATING STACKED ARTICLES

[75] Inventor: Charles H. Kuhlman, Sidney, Ohio

[73] Assignee: Aluminum Company of America, Pittsburgh, Pa.

[21] Appl. No.: 288,999

[22] Filed: Aug. 11, 1994

[51] Int. Cl.⁶ .................................................. B65G 59/06
[52] U.S. Cl. .................................. 414/798.1; 414/798
[58] Field of Search ............................... 414/789.9, 798, 414/798.1, 798.9, 941

[56] References Cited

U.S. PATENT DOCUMENTS

| | | |
|---|---|---|
| 2,457,233 | 12/1948 | Henshaw . |
| 2,936,909 | 5/1960 | Gard . |
| 3,335,699 | 8/1967 | Aiken et al. . |
| 3,672,516 | 6/1972 | Nordstrand ........................... 414/798.9 |
| 4,049,130 | 9/1977 | Bell . |
| 4,457,665 | 7/1984 | Fluck ...................................... 414/798 |
| 4,544,315 | 10/1985 | Muskulus . |
| 4,776,743 | 10/1988 | Kimura ................................ 414/798.1 |
| 4,824,306 | 4/1989 | Stevenson . |
| 4,907,942 | 3/1990 | Pfeil ........................................ 414/798 |
| 5,044,875 | 9/1991 | Hunt et al. . |
| 5,050,852 | 9/1991 | Sawada et al. . |
| 5,306,115 | 4/1994 | Montalvo et al. .................. 414/798.1 |

Primary Examiner—Michael S. Huppert
Assistant Examiner—Douglas A. Hess
Attorney, Agent, or Firm—Thomas R. Trempus

[57] ABSTRACT

A method and an apparatus for the sequential separation of individual members from a generally, axially aligned stack of members, in which the apparatus has a stack supporting structure along with a first engaging means that holds at least the penultimate individual member of the stack. A second engaging means contacts and engages the first individual member at the end of the stack adjacent the first engaging means. The second engaging means is movable between a position proximate and distal the first engaging means. The individual member, as held by the second engaging means, is axially separated from said stack of individual members and released.

21 Claims, 4 Drawing Sheets

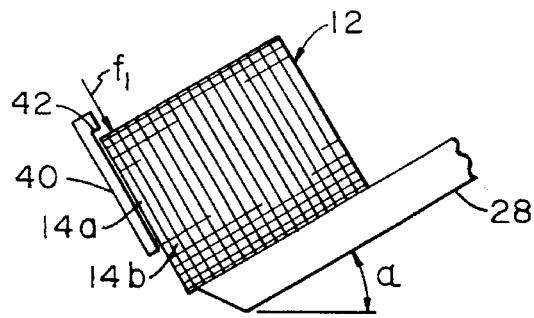
FIG. 7A
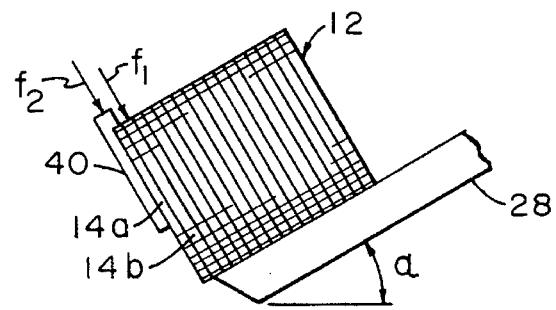
FIG. 7B
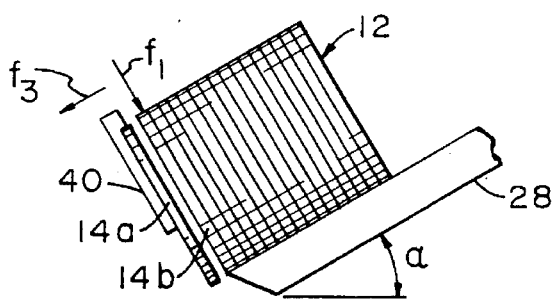
FIG. 7C
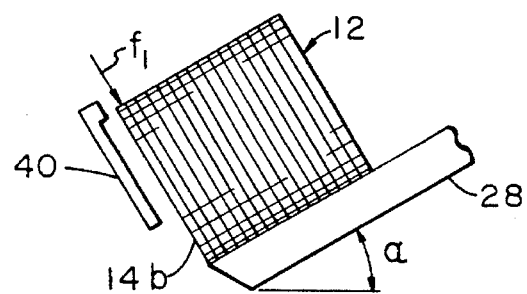
FIG. 7D
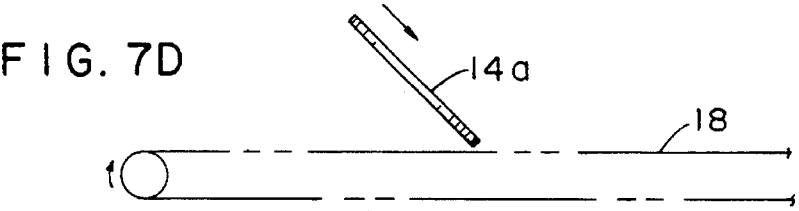

APPARATUS AND METHOD FOR SEPARATING STACKED ARTICLES

FIELD OF THE INVENTION

The invention concerns a method of separating stacked articles and an apparatus for accomplishing the method. More specifically, the invention discloses an apparatus and method particularly useful for separating stacked aluminum disks so as to avoid damage to the surface of the disks.

BACKGROUND OF THE INVENTION

Many manufacturing processes require that a plurality of substantially identical articles are subjected to various pressure and/or temperature process steps. At times, during or as a result of such process steps, the articles can be mechanically bound together. Subsequently, the bound pads must be separated prior to additional processing. One such process in which such steps take place is in the manufacture of aluminum memory disks. Memory disks are typically manufactured from a nonferrous material such as aluminum and are further processed for installation as a component of a hard drive memory in desk top computers and the like. Memory disks are typically manufactured from thin disks of aluminum sheet material. The disk can include a central aperture. During the manufacturing process for aluminum computer memory disks, blank disk is stamped from aluminum sheet. The stamped disks are collected and stacked. Pressure is applied by means of a clamping mechanism to the stack during various thermal processing steps. During such processing, the stack of individual disks often becomes tightly bound together. Upon completion of thermal processing, and prior to further processing, the individual disks must be physically separated one from another. Typically, the individual disks are pried from the stack one at a time. The separation process must be accomplished in such a fashion as to avoid causing any surface damage to the disks. The sliding contact can cause damage to the surface of the disk, rendering it useless.

A common method of separating each disk from the thermallypressed stack of disks is to use a pressurized air flow that is manually directed against the stack of disks, separating each successive disk from the stack of disks. The separated disks are manually positioned for subsequent processing. Obviously, this process is both time consuming and labor intensive. In spite of the fact that an air pressure separating technique is employed, it is not uncommon for the disks to experience some damage.

It is an object of this invention to provide a method and an apparatus for separating stacked articles.

It is also an object of the present invention to provide an apparatus by which thermally processed, pressed stacks of blank computer disks can be separated from each other.

It is a further object of this invention to provide a relatively economical apparatus capable of replacing the current labor intensive manual method of separating memory blank disks one from another after thermal processing.

It is still another object of this invention to provide a method for separating stacked articles in such a fashion as to avoid any lateral contact between the stacked objects.

SUMMARY OF THE INVENTION

The invention provides a method for the sequential separation of individual members from a stack of such individual members and an apparatus for accomplishing the method. More specifically, the invention separates a first member from a first end of an axially aligned stack of similar members.

The apparatus includes a base support member. A stack supporting means has a discharge end and a loading end supported on the base member and on which the stack of individual members is supported for separation. A stationary housing is mounted onto the base member proximate the discharge end. A first engaging means is supported in the stationary housing and is movable between an open position and a closed position. In the closed position, the first engaging means holds at least the penultimate individual member at the first end of the stack in a fixed position relative to the stationary housing.

A movable housing is operatively associated with the first housing for movement between a position proximate the stationary housing to a position distal the stationary housing. A second engaging means is supported by the movable housing. The second engaging means firmly engages the first individual member at the first end of the stack. A means is provided in communication between the fixed housing and the movable housing, urging the movable housing between first and second positions. The first individual stacked member, as engaged by the second engaging means, is axially separated from the stack of individual members. Once cleared of the stack of members and the stationary housing, the separated disk is discharged from the movable housing. A conveyance means is mounted in the base member for receiving the now separated and released first individual member and conveying or clearing this member to a desired location for subsequent processing.

BRIEF DESCRIPTION OF THE DRAWINGS

The above as well as other features and advantages of the instant invention can be appreciated through consideration of the detailed description of the invention in conjunction with the following figures in which:

FIGS. 7A through 7D are somewhat schematical representations of the separation process carried out by the separator apparatus of the instant invention.

DETAILED DESCRIPTION OF THE INVENTION

Figure 1:
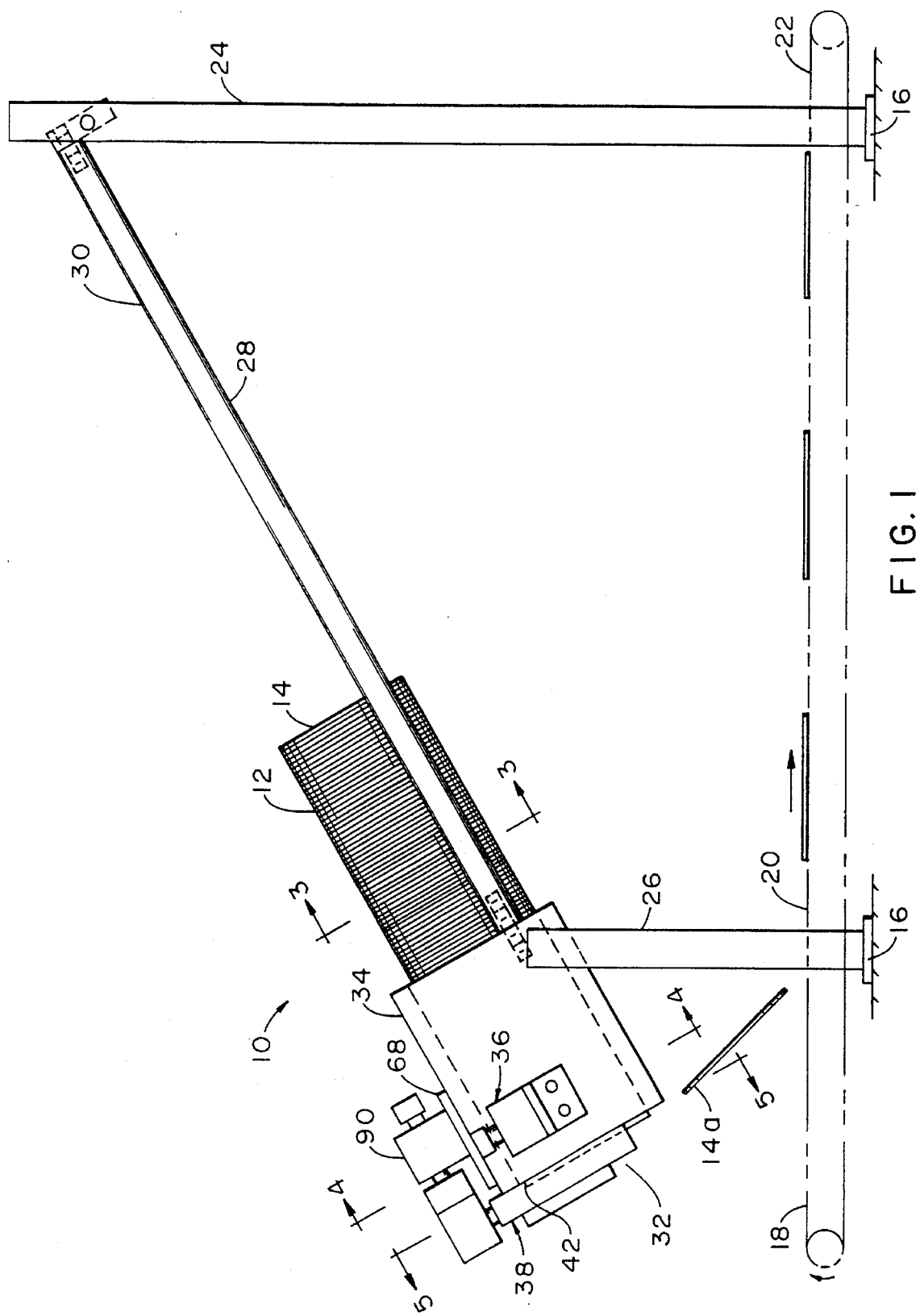
FIG. 1 is a side elevational view of the memory disk blank separator all according to the teachings of the instant invention.

An apparatus for the execution of the process of this invention is illustrated in FIG. 1. It is to be appreciated that the process and apparatus of this invention may be used for the separation of stacked articles. Numerous manufacturing processes require that a plurality of substantially identical articles be subjected to various elevated pressure and/or elevated temperature process steps. At times, during and/or as a result of such process steps, the articles can be bound together. According to the preferred embodiment of this invention, the apparatus and process are directed to and described in conjunction with the separation of stacked aluminum memory disk blanks. However, as will be readily appreciated by those skilled in the art, the process and apparatus of this invention may be applied to other stacked articles.

Figure 2:
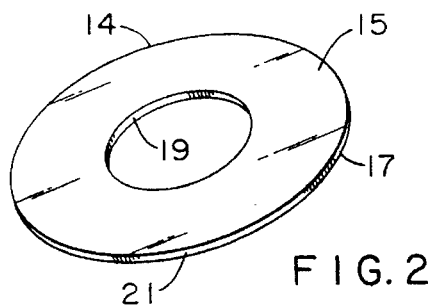
FIG. 2 is an isometric view of an aluminum memory disk.

A memory disk blank separator, according to the teachings of this invention, is illustrated in FIG. 1 and generally indicated by the reference character 10. The disk blank separator 10 is adapted to support a stack 12 of individual memory disks 14 (see FIG. 2) that have been pressure treated and are aligned as a stack 12. Each disk 14 includes opposed side faces 15 and 17, a central aperture defined by the continuous inner face or inner edge 19, and a continuous outer face or outer edge 21.

The disk blank separator 10 comprises a base portion 16 that preferably includes a conveyance means generally indicated at 18. The conveyance means 18, which includes a continuous belt traveling between two separated pulley wheels, delivers the part from a first location generally indicated at 20 where a separated part 14a is first received thereon to a second location 22 where the separated disk can be further manipulated as may be required by any subsequent manufacturing process.

Figure 3:
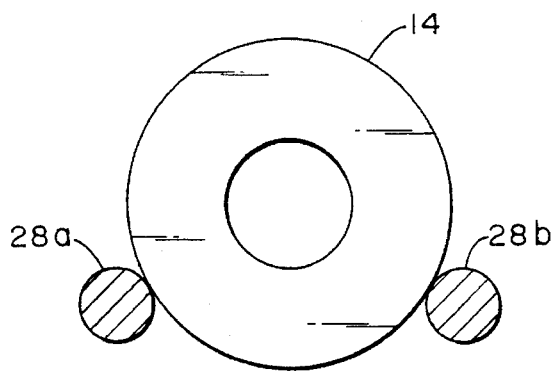
FIG. 3 is a cross sectional view of a stack of aluminum memory disks mounted in the separator apparatus of this invention as shown along lines 3—3 of FIG. 1.

The disk blank separator 10 further includes a first vertical support member 24 and a second vertical support member 26. A stack supporting means 28 preferably consisting of a pair of tubular runners 28a and 28b as shown in FIG. 3 has a loading end generally indicated by the reference character 30 and a discharge end 32. As can be appreciated, the support members 24 and 26 can be configured to be individual supporting structures or pairs of adjacent supporting structures adapted to engage opposed sides of the stack supporting means 28.

A stationary housing 34 is mounted on the base member and is disposed proximate the discharge end 32 of the stack supporting means 28. According to the preferred embodiment, the stack of individual parts to be separated is gravity fed by means of the inclined chute defined by the stack supporting means 28, the pair of rods or runners 28a and 28b. It is to be appreciated that the chute can be disposed at any angle α (FIGS. 7A, 7B, and 7D) between the horizontal and the vertical. However, the closer that the chute is to the horizontal, the more likely that an additional apparatus for indexing the stack of disks along the chute will be required. An indexing means such as a pneumatic or electrically driven push rod can be incorporated into the apparatus in order to sequentially and positively feed the members to be separated into the fixed housing. Preferably, the chute is disposed at an angle sufficient to utilize a gravity feed. The desirable angle α for the chute is between about 20 and 50 degrees relative to the horizontal. Preferably, the chute is inclined between about 30 to 40 degrees relative to the horizontal. Typically, the conveyance means is disposed horizontally.

Figure 4:
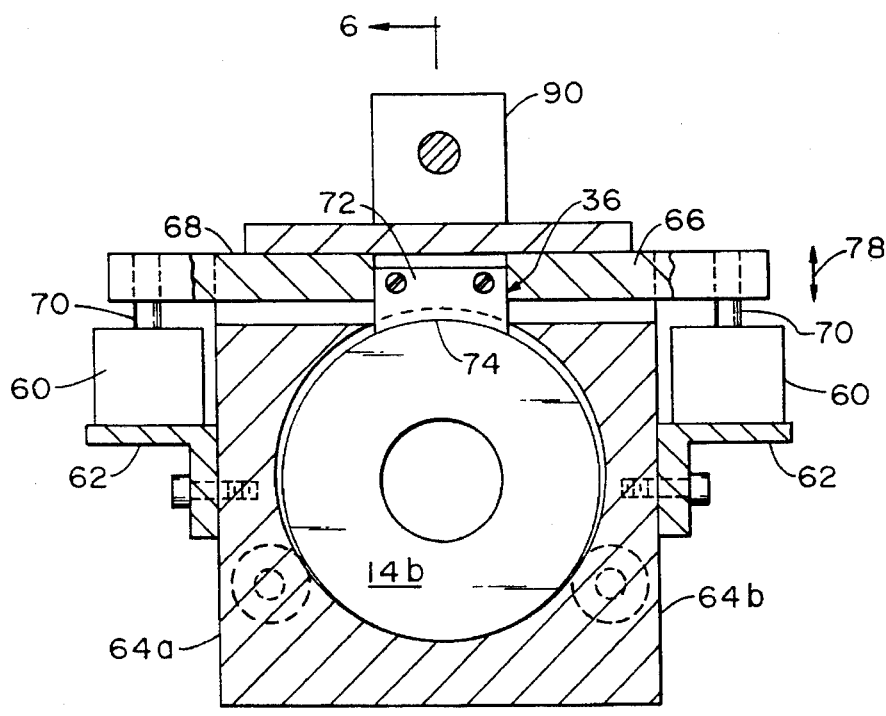
FIG. 4 is a cross sectional view of the stationary housing of the separator apparatus along lines 4—4 of FIG. 1.
Figure 6:
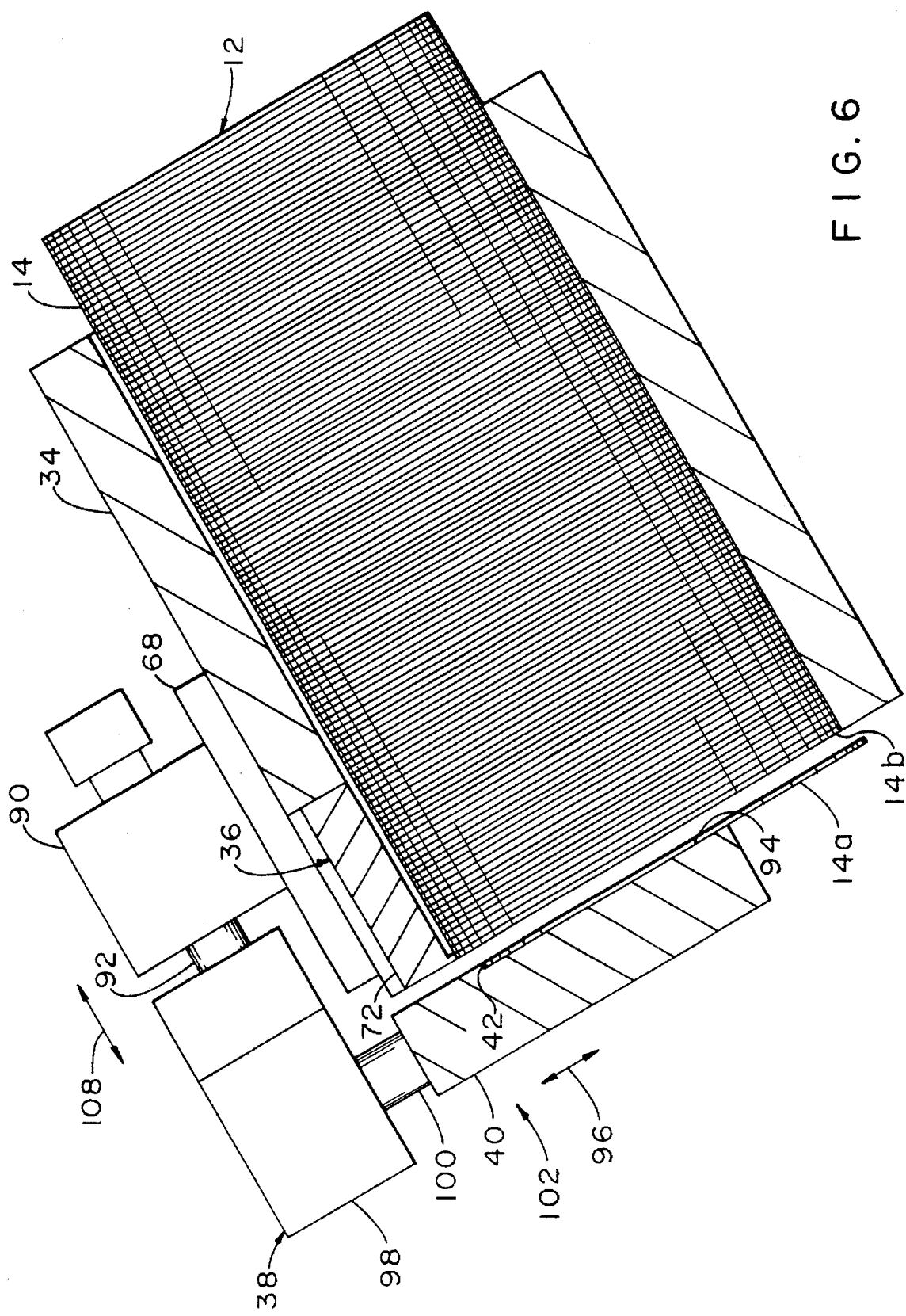
FIG. 6 is a cross sectional view of a stack of aluminum memory disks mounted in a separator apparatus along lines 6—6 of FIG. 4.

Turning now to FIGS. 1 and 4, the stationary housing 34 includes a first engaging means generally indicated by the reference character 36. The first engaging means 36 is movable between an open position and a closed position as shown in FIGS. 4 and 6. In the closed position, the first engaging means 36 is actuated to engage the continuous outer edge 21 of the penultimate disk 14b and hold at least the penultimate individual member 14b at the first end of the stack 12 in a fixed position relative to the stationary housing 34. The first engaging means 36 includes a pair of actuator means such as pneumatic cylinders 60 that are supported on brackets 62 extending from opposed sides 64a and 64b of the stationary housing 34. A cross member 66 extends across the top 68 of the stationary housing 34 and is in mechanical communication with the pistons 70 of the pneumatic cylinders 60. A clamping member 72 having a radius of curvature 74 that is selected to accommodate the dimensions of the articles to be separated extends from the central portion of the cross member 66. The stationary housing 34 is provided with an access port through which the clamping member 72 depends. As the pistons 70 of the pneumatic cylinders 60 are actuated, the clamping member 72 reciprocates as shown by arrow 78 between a downwardly disk engaging position and an upward position that frees the stack of disks to permit the indexing of the entire stack. It is to be appreciated, that while the first engaging means is described as cooperating with the penultimate individual member (14b) of the stacked parts (12) to be separated, it is possible for the first engaging means to grip and hold additional members of the stack to be separated or if appropriate the entire stack. In such a configuration, an additional engaging means as described above can be disposed in a second location of the stationary housing, or for example, the clamping member 72 can be modified so as to engage one or more additional disks or even all of the disks presented to the separator apparatus.

The disk blank separator 10 further includes a movable housing 38 at the discharge end 32 of the stack supporting means. The movable housing 38 reciprocates between a first position that is proximate the stationary housing 34 to a second position that is distal the stationary housing 34. The movable housing 38 further includes a part stop member 40 that stops the travel of the stack of disks during the gravity feed or indexing of the articles for separation when the first engaging means 36 is disengaged from the articles.

Figure 5:
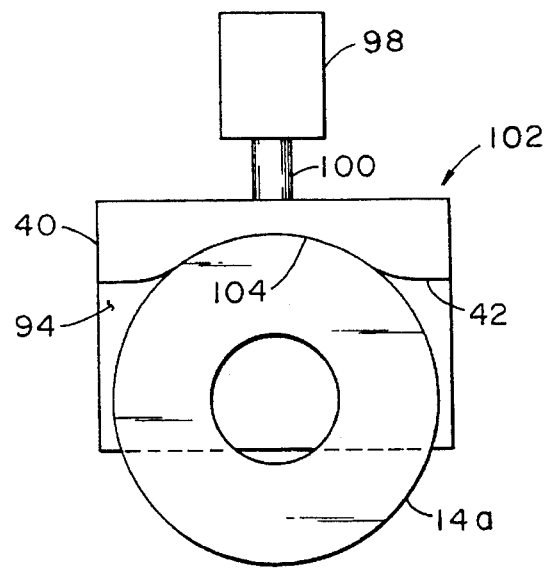
FIG. 5 is a cross sectional view of the movable housing of the separator apparatus along lines 5—5 of FIG. 1.

The movable housing 38 and part stop member 40 can be better appreciated through consideration of FIGS. 1, 5 and 6. The movable housing reciprocates between a first position proximate the stationary housing 34 and a second position distal the stationary housing. Means such as a pneumatic cylinder 90 is mounted on the top portion 68 of the stationary housing 34. The piston 92 of the cylinder 90 is in mechanical communication with the movable housing 34 to effect the aforedescribed reciprocal movement.

The part stop member 40 includes a recessed portion 42 that defines a seat into which the stack 12 of disks slides and functions as a second engaging means. The disk to be separated, indicated at 14a, contacts the face 94 of the recessed portion as the stack of disks slides through the stationary housing. The part stop member is supported by the movable housing means for reciprocal movement between a part receiving position and a part engaging position as indicated by the arrow 96. A pneumatic cylinder 98 is supported within the movable housing 38. A piston 100 of the pneumatic cylinder 98 is in mechanical communication with the part stop member 40 to effect the aforedescribed reciprocal movement. In the part receiving position, the part stop member 40 is in its upper most position as shown in FIG. 7A and the disk 14a slides into contact with the face 94 of the recessed portion 42. With the disk 14a so seated, the pneumatic cylinder 98 causes the piston 100 and the part stop member 40 to move downwardly as shown in FIG. 7B to engage the upper portion of the edge 21 of the disk 14a. The second engaging means generally indicated at reference character 102 is defined by the recessed portion 42 and face 94 of the part stop member 40. The recess portion 42 includes the face 94 and an part engaging surface 104. The part engaging surface 104 can have a radius of curvature that is selected to accommodate the dimensions of the articles to be separated. The pneumatic cylinder 98 provides sufficient force for the second engaging means 102 to maintain contact with the disk 14a. However, the force is controlled so as not to cause the disk 14a to separate from the stack of disks. Separation is effected by means of the reciprocal movement of the movable housing 38 as indicated by the arrow 108 between the first position proximate the stationary housing and the second position distal the stationary housing. In other words, the second engaging means 102 tends to pry the last disk from the stack of disks. The amount of clearance between the first and second positions depends upon the amount of total clearance necessary to clear the separated article from the stationary housing and to drop the separated article from the part stop member onto the conveyance system. Accordingly, the overall dimension of the separated article tends to control the total required clearance. In operation, the first engaging means 36 holds the stack 12 of parts to be separated in an axially-fixed position. The second engaging means 102 frictionally engages the specific part to be separated from the stack. The second engaging means 102 separates axially from the first engaging means 36 by means of the movable housing 38. The second engaging means urges the disk away and separates it from the stack, allowing the separated disk to fall free from the stop member of the movable housing. The separated part 14a freely falls from the movable housing in its distal location to the conveyance means 18 disposed along the base of the disk blank separator.

As can be appreciated through a consideration of FIGS. 7A through 7D, the method and apparatus of this invention accomplishes essentially two functions simultaneously. In FIG. 7A, the apparatus holds the stack 12 of memory disks by physically engaging the disk 14b adjacent the disk 14a to be separated by the application of force $f_1$ through the first engaging means 36. In FIG. 7B, a second engaging means 42 engages the edge of the disk 14a to be separated by applying a force $f_2$ sufficient to hold the disk during disengagement. In FIG. 7C, a separation cylinder then causes the second engaging means to urge the disk 14a from the stack of disks remaining in the guide by the exertion of force $f_3$ in the direction shown. The release of the disk 14a from the disk 14b while the part stop member is applying force $f_2$ against the disk 14a may result in some slight downward movement. The separated disk 14a is shown in FIG. 7D. It is to be appreciated that the first engaging means in addition to gripping the disk next to the one to be removed or separated, may be designed so as to engage all of the disks in the separator or any desired number of them. However, the disk adjacent the disk to be separated must be gripped and held in place. The separated disk 14a is released and permitted to fall onto the conveyor 18 positioned below the separator apparatus. The process then begins anew as the part stop member returns to a position proximate the stack of disks and slightly elevated to permit the stack of disks to slide through the stationary housing as soon as the first engaging means disengages from the disk 14b.

It is to be appreciated that various mechanisms can be used in combination with the separator apparatus of this invention to load stacked members onto it and to recover the individual separated members.

Having described the invention, what is claimed is:

1. An apparatus for the sequential separation of individual members each having opposed side faces and an outer edge extending there between from a first end of an axially aligned stack of said members comprising:

a stack supporting means having a discharge end and a loading end on which said stack of individual members is supported on the members' edge for separation;

a first engaging means operably associated with said stack supporting means and movable between an open position and a closed position, whereby in said closed position, said first engaging means holds only the edge of at least the penultimate individual member of the first end of said stack;

a second engaging means movable between a first position and a second position, whereby in said second position, said second engaging means engages the edge of the first individual member at the first end of said stack, said second engaging means being operably associated with said stack supporting means so as to be movable between a position proximate said first engaging means to a position distal said first engaging means;

a means for moving said second engaging means between said positions proximate and distal said first engaging means, whereby said first individual member, as engaged at the edge thereof by said second engaging means, is axially separated from said stack of individual members whereby the axially separated individual member is separated from the stack, free falling from the stack.

2. The apparatus according to claim 1 including a base member for supporting said stack supporting means.

3. The apparatus according to claim 2 wherein the base member supports said stack supporting means at a predetermined angle relative to horizontal of between about 20 degrees and 50 degrees.

4. The apparatus according to claim 2 wherein the base member supports said stack supporting means at a predetermined angle relative to horizontal of approximately between about 30 to 40 degrees.

5. The apparatus according to claim 1 including a housing means receiving the stacked members thereon and supporting the first and second engaging means.

6. The apparatus according to claim 2 including a conveyance means mounted in the base member for receiving the now separated and released first individual member and conveying said received and separated member from said apparatus.

7. The apparatus according to claim 1 wherein the first engaging means cooperates with the stack supporting means to maintain the stacked member in a desired location relative to the stack supporting means.

8. The apparatus according to claim 7 wherein the first engaging means has a member engaging surface adapted to conform to the surface of the stacked members.

9. The apparatus according to claim 1 wherein the second engaging means includes a face and a stepped portion.

10. The apparatus according to claim 1 wherein the means for moving the second engaging means between the positions proximate and distal the first engaging means is a pneumatic cylinder.

11. An apparatus for the sequential separation of individual memory disk blanks each of which has opposed side faces and a continuous outer edge extending there between from a stack of memory disk blanks bonded together to form a generally axially aligned stack of blanks comprising:

a stack supporting means having a discharge end and a loading end on which said stack of blanks is supported on the disk blanks' edges for separation;

a first engaging means operably associated with said stack supporting means and movable between an open position and a closed position, whereby in said closed position, said first engaging means holds only the edge of at least the penultimate individual blank of the first end of said stack;

a second engaging means movable between a first position and a second position, whereby in said second position, said second engaging means engages the edge of the first individual blank at the first end of said stack, said second engaging means being operably associated with said stack supporting means so as to be movable between a position proximate said first engaging means to a position distal said first engaging means;

a means for moving said second engaging means between said positions proximate and distal said first engaging means, whereby said first individual blank, as engaged at the edge thereof by said second engaging means, is axially separated from said stack and whereby as said second engaging means moves into the distal position relative to said first engaging means free falls from said second engaging means, said now separated first individual blank of said stack is released.

12. The apparatus according to claim 11 including a base member for supporting said stack supporting means.

13. The apparatus according to claim 12 wherein the base member supports said stack supporting means at a predetermined angle relative to horizontal of between about 20 degrees and 50 degrees.

14. The apparatus according to claim 12 wherein the base member supports said stack supporting means at a predetermined angle relative to horizontal of between approximately 30 degrees and 40 degrees.

15. The apparatus according to claim 11 including a housing means receiving the stacked blanks thereon and supporting the first and second engaging means.

16. The apparatus according to claim 12 including a conveyance means mounted in the base member for receiving the now separated and released first individual member and conveying said received and separated blanks from said apparatus.

17. The apparatus according to claim 11 wherein the first engaging means cooperates with the stack supporting means to maintain the stacked blanks in a desired location relative to the stack supporting means.

18. The apparatus according to claim 17 wherein the first engaging means is a clamp member having a clamping surface adapted to conform to the stacked blanks.

19. The apparatus according to claim 11 wherein the means for moving the second engaging means between the positions proximate and distal the first engaging means is a pneumatic cylinder.

20. An apparatus for the sequential separation of individual members each having opposed side faces and an outer edge extending there between from a first end of an axially aligned stack of said members comprising:

a base support member;

a stack supporting means having a loading end and a discharge end, spaced from said loading end, supported on said base support member and on which said stack of individual members is supported on the members edges for separation;

a stationary housing adapted to receive said stack of members therein, mounted on said base support member and disposed proximate said stack supporting means discharge end;

a first engaging means supported in said stationary housing and movable between an open position and a closed position, whereby in said closed position, said first engaging means holds at least the penultimate individual member of the first end of said stack in a fixed position relative to said stationary housing;

a movable housing operably associated with said stationary housing for movement between a position proximate said stationary housing and a position distal said stationary housing;

a second engaging means supported by said movable housing, said second engaging means movable between a first position and a second position, whereby in said second position, said second engaging means engages the edge of the first individual member at the first end of said stack;

a means for moving the movable housing between said first and second positions whereby said first individual member, as engaged by said second engaging means, is axially separated, from said stack of individual members, said now separated first individual member of said stack free falling from said second engaging means; and a conveyance means mounted in said base member for receiving the now separated and released first individual member and conveying said received and separated member from said apparatus.

21. A method for separating an axially aligned stack of disks, each disk having opposed side faces and an outer edge extending there between, one from another comprising the steps of indexing said stack of disks into a first location such that the penultimate disk of the stack is in a predetermined location; holding the outer edge of the penultimate disk in the predetermined location; engaging the outer edge of a disk to be separated along a portion of its outer edge by applying sufficient force so as to engage the disk while not effecting separation of the disk from the stack; and while so engaging the disk, effecting the axial displacement of the disk to be separated from the penultimate disk, such that said separated disk freely disengages and falls from the axially aligned stack.

* * * * *